United States Patent
Dunbar et al.

(10) Patent No.: US 11,844,416 B2
(45) Date of Patent: *Dec. 19, 2023

(54) ATTACHMENT DEVICE

(71) Applicant: Hand Held Products, Inc., Charlotte, NC (US)

(72) Inventors: Blake Dunbar, Mount Laurel, NJ (US); Jordan Yoder, Mount Laurel, NJ (US)

(73) Assignee: HAND HELD PRODUCTS, INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/056,480

(22) Filed: Nov. 17, 2022

(65) Prior Publication Data

US 2023/0081065 A1 Mar. 16, 2023

Related U.S. Application Data

(63) Continuation of application No. 17/159,317, filed on Jan. 27, 2021, now Pat. No. 11,583,058.

(51) Int. Cl.
*G06K 7/14* (2006.01)
*A45F 5/00* (2006.01)
*G06K 7/10* (2006.01)

(52) U.S. Cl.
CPC .............. *A45F 5/00* (2013.01); *G06K 7/1413* (2013.01); *G06K 7/1417* (2013.01);
(Continued)

(58) Field of Classification Search
CPC .......... A45F 2005/025; A45F 2005/028; A45F 2005/008; A45F 2200/0516;
(Continued)

(56) References Cited

U.S. PATENT DOCUMENTS 5,056,805 A * 10/1991 Wang ...................... F16C 11/10
280/658
5,675,138 A 10/1997 La
(Continued)

FOREIGN PATENT DOCUMENTS

CN 203164983 U 8/2013
CN 203773559 U 8/2014
(Continued)

OTHER PUBLICATIONS

U.S. Appl. No. 17/159,317, filed Jan. 27, 2021, Pub. No. 2022/0232957, Allowed.
(Continued)

*Primary Examiner* — Adam J Waggenspack
(74) *Attorney, Agent, or Firm* — Alston & Bird LLP

(57) ABSTRACT

The present disclosure provides an attachment device comprising a first subassembly, comprising a mounting component, a retainer component, coupled to a second subassembly comprising a first rotatable component, a second rotatable component, and a trigger assembly. The mounting component comprises an opening defining at least one slot. The retainer component is coupled to the mounting component defining a first cavity. The spring component, housed in the first cavity, is coupled to the retainer component. The first rotatable component is coupled to the second rotatable component to define a second cavity extending from a first surface of the first rotatable component to a second surface of the second rotatable component. A trigger actuator of the trigger assembly is housed in the second cavity. The first rotatable component defines at least one tab defined to be received within the at least one slot of the mounting component.

20 Claims, 6 Drawing Sheets

(52) U.S. Cl.
CPC . *A45F 2005/008* (2013.01); *A45F 2200/0525* (2013.01); *G06K 2007/10534* (2013.01)

(58) Field of Classification Search
CPC ....... A45F 2005/002; A45F 2200/0525; G06K 7/10891; F41C 33/045; B60R 2011/0085; Y10T 403/32385; Y10T 403/32401; Y10T 403/32409; Y10T 403/32418; Y10T 403/32426; Y10T 403/32442
USPC ........................................................ 224/197
See application file for complete search history.

(56) References Cited

U.S. PATENT DOCUMENTS

| | | | |
|---|---|---|---|
| 6,098,877 A | 8/2000 | Barkan et al. | |
| 9,235,742 B1 | 1/2016 | Qaddoura et al. | |
| 1,115,966 A1 | 10/2021 | Qi | |
| 11,159,663 B2* | 10/2021 | Chen | F16M 13/02 |
| 11,583,058 B2* | 2/2023 | Dunbar | G06K 7/10891 |
| 2008/0078837 A1 | 4/2008 | Morris et al. | |
| 2008/0078838 A1* | 4/2008 | Morris | G06K 7/10881 |
| | | | 235/462.44 |
| 2011/0254450 A1* | 10/2011 | Bergholz | H05B 45/58 |
| | | | 315/121 |
| 2012/0031865 A1 | 2/2012 | Paeth | |
| 2012/0318654 A1 | 12/2012 | Harris et al. | |
| 2014/0249944 A1 | 9/2014 | Hicks et al. | |
| 2014/0360893 A1 | 12/2014 | Whitten et al. | |
| 2015/0318885 A1 | 11/2015 | Earle | |
| 2016/0309249 A1 | 10/2016 | Wu et al. | |
| 2016/0357999 A1 | 12/2016 | Hsieh et al. | |
| 2017/0300730 A1 | 10/2017 | Kamel | |
| 2018/0310699 A1 | 11/2018 | Oberpriller | |
| 2019/0251310 A1 | 8/2019 | Oberpriller et al. | |
| 2020/0022433 A1 | 1/2020 | Lu et al. | |
| 2020/0272801 A1 | 8/2020 | Mistkawi et al. | |
| 2020/0380218 A1 | 12/2020 | Handshaw et al. | |

FOREIGN PATENT DOCUMENTS

| | | |
|---|---|---|
| CN | 106295440 A | 1/2017 |
| CN | 206312163 U | 7/2017 |
| CN | 206313163 U | 7/2017 |
| CN | 206647729 U | 11/2017 |
| CN | 206849033 U | 1/2018 |
| CN | 207334191 U | 5/2018 |
| CN | 207623985 U | 7/2018 |
| CN | 209265443 U | 8/2019 |
| CN | 110728158 A | 1/2020 |
| CN | 112036198 A | 12/2020 |
| JP | 08-263581 A | 10/1996 |
| JP | 2012-238224 A | 12/2012 |
| JP | 3211589 U | 7/2017 |

OTHER PUBLICATIONS

Advantech. (Jun. 11, 2019). LEO-W Wearable 1D Barcode Scanner Ring for Workflow Optimization [Video]. YouTube. https://www.youtube.com/watch?app=desktop&v=v6xrSNYIxyY.

European search report dated May 31, 2022 for EP Application No. 22152326.

Imager Co., Ltd. Honeywell VAD, the only company in Japan. (Dec. 26, 2016). Honeywell 8670 Ring Scanner [Video]. YouTube. https://www.youtube.com/watch?app=desktop&v=CDP7SPe8oAU.

Netum. R2 Bluetooth Ring 2D Barcode Scanner and R3 Wearable CCD Barcode Scanner Imager Screen for POS Android IOS iMac Ipad (Model No. NT-R3). https://www.aliexpress.com/item/32843873741.html.

Notice of Allowance received for U.S. Appl. No. 17/159,317, dated Aug. 17, 2022, 8 pages.

Tera. Wireless Barcode Scanner [1 MP Camera] 1D 2D QR Portable Wearable Ring Finger Mini Bar Code Reader Versatile 3-in-1 Compatible with BT & 2.4GHz & USB 2.0. https://www.amazon.com/dp/B07T9DTZHZ/.

Zebra. (2021). RS5100 Ring Scanner: Accessories Guide. https://www.zebra.com/content/dam/zebra_new_ia/en-us/solutions-verticals/product/Mobile_Computers/Wearable%20Computers/rs5100/guide-accessory/rs5100-guide-accessory-en-us.pdf.

English Translation of JP Office Action dated Oct. 17, 2022 for JP Application No. 2022009211.

Notice of Allowance and Fees Due (PTOL-85) dated Aug. 17, 2022 for U.S. Appl. No. 17/159,317.

English translation of JP Decision to Grant dated Feb. 8, 2023 for JP Application No. 2022009211.

JP Decision to Grant dated Feb. 8, 2023 for JP Application No. 2022009211.

Notice of Allowance and Fees Due (PTOL-85) dated Jan. 5, 2023 for U.S. Appl. No. 17/159,317.

Intention to grant dated May 15, 2023 for EP Application No. 22152326, 8 page(s).

CN Office Action dated Apr. 14, 2023 for CN Application No. 202210096774, 7 page(s).

JP Office Action dated Oct. 17, 2022 for JP Application No. 2022009211, 2 page(s).

Decision to grant a European patent dated Sep. 14, 2023 for EP Application No. 22152326, 2 page(s).

CN Notice of Allowance dated Oct. 12, 2023 for CN Application No. 202210096774, 7 page(s).

* cited by examiner

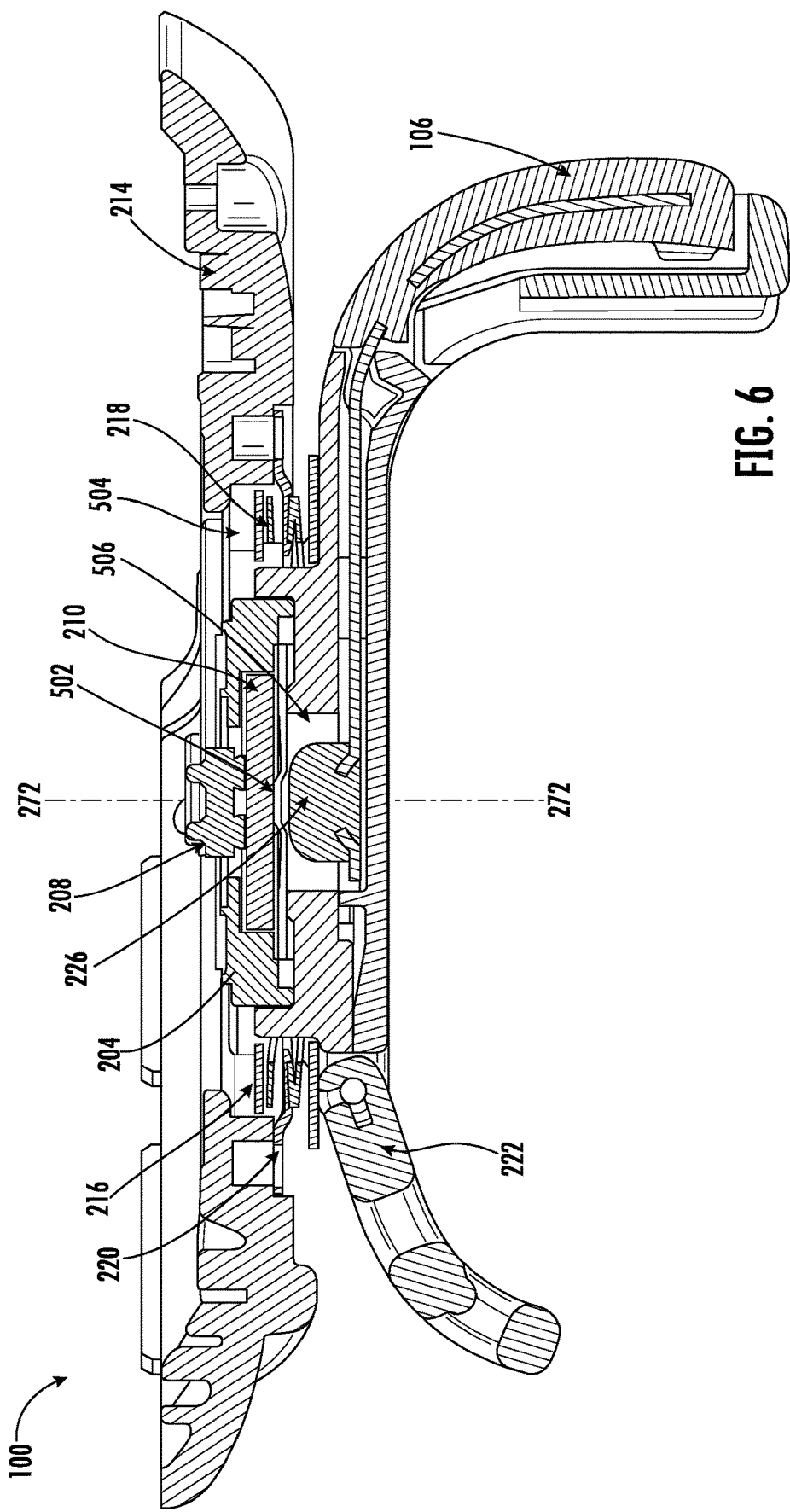

ATTACHMENT DEVICE

CROSS-REFERENCE TO RELATED APPLICATIONS

This application is a continuation of U.S. patent application Ser. No. 17/159,317 filed Jan. 27, 2021, which is incorporated herein by reference in its entirety.

TECHNICAL FIELD

Example embodiments of the present disclosure relate generally to an attachment device, more particularly, to structural configuration of the attachment device configured to be coupled to an electronic device.

BACKGROUND

Wearable electronic devices such as, ring scanners, are typically used in warehouse and logistics environments to scan one-dimensional (1D) or two-dimensional (2D) machine-readable symbols such as barcodes, Data Matrix, etc. Such ring scanners are typically worn on a user's finger. To operate the ring scanner, the user aims the finger attached to the ring scanner towards the intended symbol and actuates the ring scanner by depressing a trigger button provided on the ring scanner with the user's thumb.

BRIEF SUMMARY

Various embodiments described herein illustrate an attachment device comprising a first subassembly and a second subassembly. The second subassembly pivotally coupled to the first subassembly. The first subassembly comprises a mounting component, a retainer component, and a spring component. The mounting component comprises an opening defining at least one slot. The opening of the mounting component defines an axis for rotation of the first subassembly. The retainer component is coupled to the mounting component defining a first cavity extending from a first surface of the mounting component to a second surface of the mounting component. The first surface of the mounting component is opposite the second surface of the mounting component. The spring component is coupled to the retainer component. The spring component is housed in the first cavity. The second subassembly is defined to rotate about the axis. The second subassembly comprises a first rotatable component, a second rotatable component, and a trigger assembly. The first rotatable component defines at least one tab defined to be received within the at least one slot of the opening of the mounting component of the first subassembly. The second rotatable component is coupled to the first rotatable component. The coupling of the second rotatable component to the first rotatable component defines a second cavity extending from a first surface of the first rotatable component to a second surface of the second rotatable component. The first surface of the first rotatable component is opposite the second surface of the second rotatable component. The trigger assembly is coupled to the second rotatable component. The trigger assembly comprises a trigger actuator being housed in the second cavity.

Various embodiments described herein illustrate an apparatus comprising an attachment device and an electronic device configured to be coupled to the attachment device. The attachment device comprises a first subassembly and a second subassembly. The second subassembly pivotally coupled to the first subassembly. The first subassembly comprises a mounting component, a retainer component, and a spring component. The mounting component comprises an opening defining at least one slot. The opening of the mounting component defines an axis for rotation of the first subassembly. The retainer component is coupled to the mounting component defining a first cavity extending from a first surface of the mounting component to a second surface of the mounting component. The first surface of the mounting component is opposite the second surface of the mounting component. The spring component is coupled to the retainer component. The spring component is housed in the first cavity. The second subassembly is defined to rotate about the axis. The second subassembly comprises a first rotatable component, a second rotatable component, and a trigger assembly. The first rotatable component defines at least one tab defined to be received within the at least one slot of the opening of the mounting component of the first subassembly. The second rotatable component is coupled to the first rotatable component. The coupling of the second rotatable component to the first rotatable component defines a second cavity extending from a first surface of the first rotatable component to a second surface of the second rotatable component. The first surface of the first rotatable component is opposite the second surface of the second rotatable component. The trigger assembly is coupled to the second rotatable component. The trigger assembly comprises a trigger actuator being housed in the second cavity.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 5-6 exemplarily illustrate sectional views of the attachment device showing two modes of operation of the attachment device, according to one or more embodiments described herein.

DETAILED DESCRIPTION OF THE INVENTION

Figure 1:
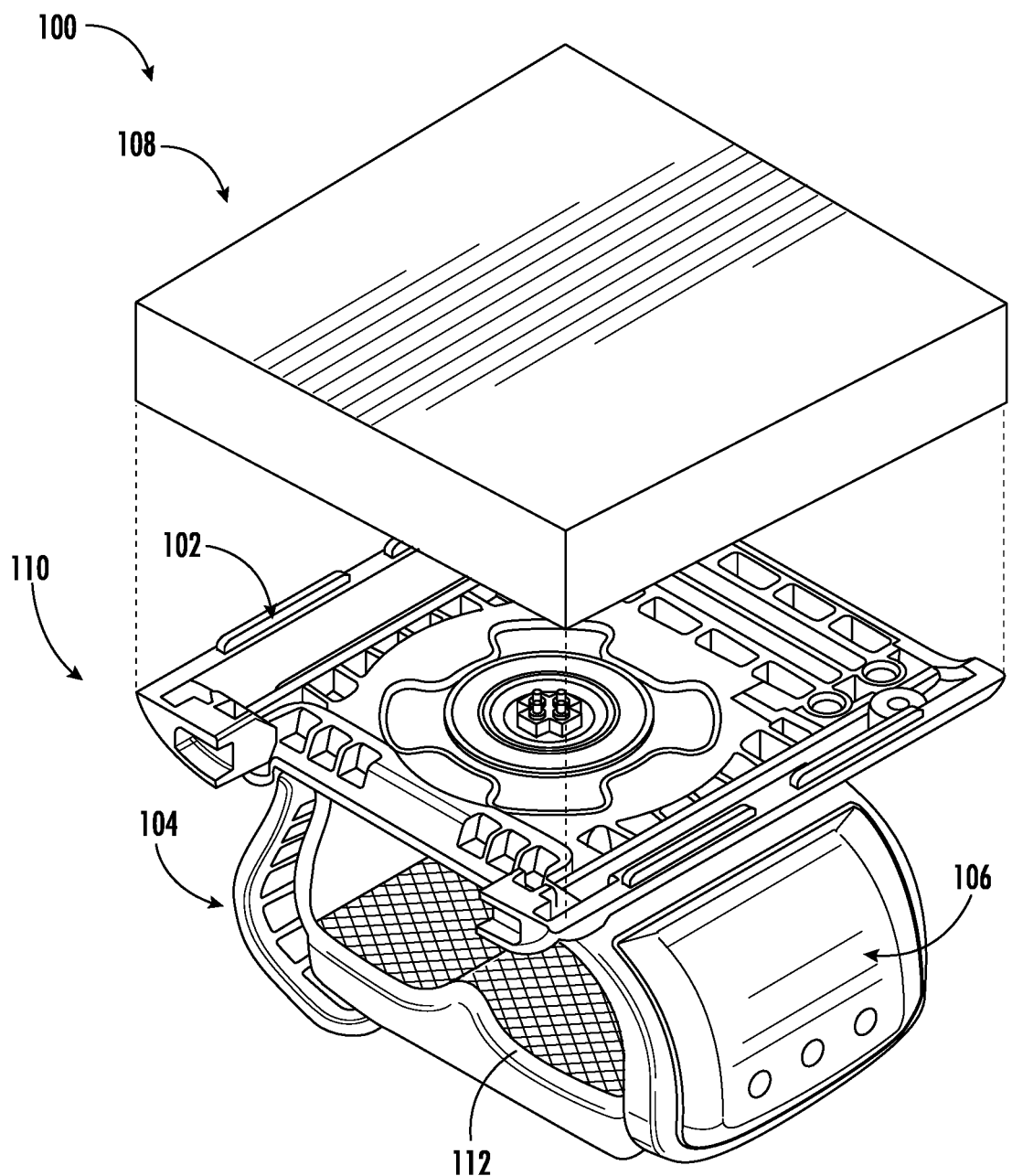
FIG. 1 exemplarily illustrates a perspective view of an apparatus comprising an attachment device and an electronic device, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

Embodiments of the present invention recognize that for a user to be able to switch between right-handed or left-handed operation of a wearable electronic device such as a scanning device, the user has to detach the electronic device from an attachment accessory such as a ring accessory, remove the ring accessory from the user's finger, and then change the orientation of the electronic device. This affects productivity and efficiency of the user and interrupts workflow processes in a work environment. Further, typically, these ring accessories allow rotation of the attached electronic device to only two positions based on preference of a right-handed or a left-handed user.

The present disclosure provides an ergonomic device handling experience to a user using an attachment device disclosed in the present disclosure. The attachment device comprises a first subassembly and a second subassembly that are pivotally coupled to each other such that, when the user wishes to change an orientation of an electronic device configured to be coupled to the attachment device, the user may either rotate the first subassembly or the second subassembly to position the electronic device in a desired scanning/reading position. The first subassembly of the attachment device comprises a mounting component defined to mount the electronic device on the attachment device, a spring component defined to facilitate rotational movement of the first subassembly or the second subassembly, and a retainer component defined to retain the spring component in position. The second subassembly comprises a first rotatable component coupled to a second rotatable component and a trigger assembly. The first rotatable component houses a circuit assembly of the attachment device that is configured to electrically couple with a corresponding circuit assembly of the electronic device to be coupled to the attachment device. The second rotatable component accommodates the trigger assembly comprising a trigger actuator housed in the second rotatable component and a trigger button mounted on the second rotatable component to allow actuation of the electronic device configured to be coupled to the attachment device.

FIG. 1 exemplarily illustrates a perspective view of an apparatus 100 comprising an attachment device 110 and an electronic device 108, according to one or more embodiments described herein. As used herein, the phrase "attachment device" refers to a device that is configured to accommodate an electronic device 108 and configured to be attached to a user's body part such as a finger, a thumb, a hand, a wrist, an arm, etc. For example, the attachment device 110 is configured to electronically couple to an electronic device 108 such as a ring scanner and provide adequate stability when attached to a user's finger. In an embodiment, the electronic device 108 may be any handheld electronic device such as an indicia scanner, a ring scanner, or other relatively small, portable electronic device capable of being carried on a user's finger. In an embodiment, the scope of the disclosure is not limited to the attachment device 110 being attached to a user's finger, but may be attached to any other body part of the user such as, a thumb, a hand, a wrist, an arm, etc., without departing from the scope of the disclosure.

In an embodiment, the attachment device 110 comprises a first subassembly 102 and a second subassembly 104. The structures and elements of the first subassembly 102 and the second subassembly 104 is described in detail in conjunction with FIG. 2. In an embodiment, the first subassembly 102 is configured to mount the electronic device 108 to allow coupling of the electronic device 108 to the attachment device 110 by using a fastening element (not shown). In an example embodiment, the fastening element may comprise screw holes, bosses, etc., that are used to mate with respective fastening elements (not shown) such as, threaded inserts on the electronic device 108. The electronic coupling of the electronic device 108 to the attachment device 110 is described in detail in conjunction with FIG. 3.

In an embodiment, the second subassembly 104 comprises a trigger button 106, as exemplarily illustrated in FIG. 1. In an embodiment, the trigger button 106 is configured to actuate the electronic device 108 configured to be coupled to the attachment device 110, which will be described further in conjunction with FIG. 3.

In an example embodiment, a user may mount the electronic device 108 such as, a ring scanner on the first subassembly 102, which may be actuated by depressing the trigger button 106 positioned on the second subassembly 104 of the attachment device 110. The user may insert his/her finger through a strap component 112 of the second subassembly 104 of the attachment device 110. For example, a right-handed user may insert index finger of the right hand onto the strap component 112 of the second subassembly 104 of the attachment device 110 and may actuate the electronic device 108 mounted on the first subassembly 102 of the attachment device 110 by depressing the trigger button 106 with a thumb of the right hand of the user.

Similar operation may be performed by a left-handed user to operate the electronic device 108 coupled to the attachment device 110. For example, if the user wishes to switch the electronic device 108 to the left hand, the user inserts his/her index finger of the left hand onto the strap component 112 of the second subassembly 104 of the attachment device 110 and may actuate the electronic device 108 mounted on the first subassembly 102 of the attachment device 110 by depressing the trigger button 106 with a thumb of the left hand of the user. In an embodiment, orientation of the electronic device 108 mounted on the first subassembly 102 of the attachment device 110 is changed by the user by pulling up the first subassembly 102 of the attachment device 110 to allow rotation of the mounted electronic device 108 to a desired angle ergonomically comfortable for the left-handed user, the details of which are described in detail in conjunction with FIGS. 5-6.

Figure 2:
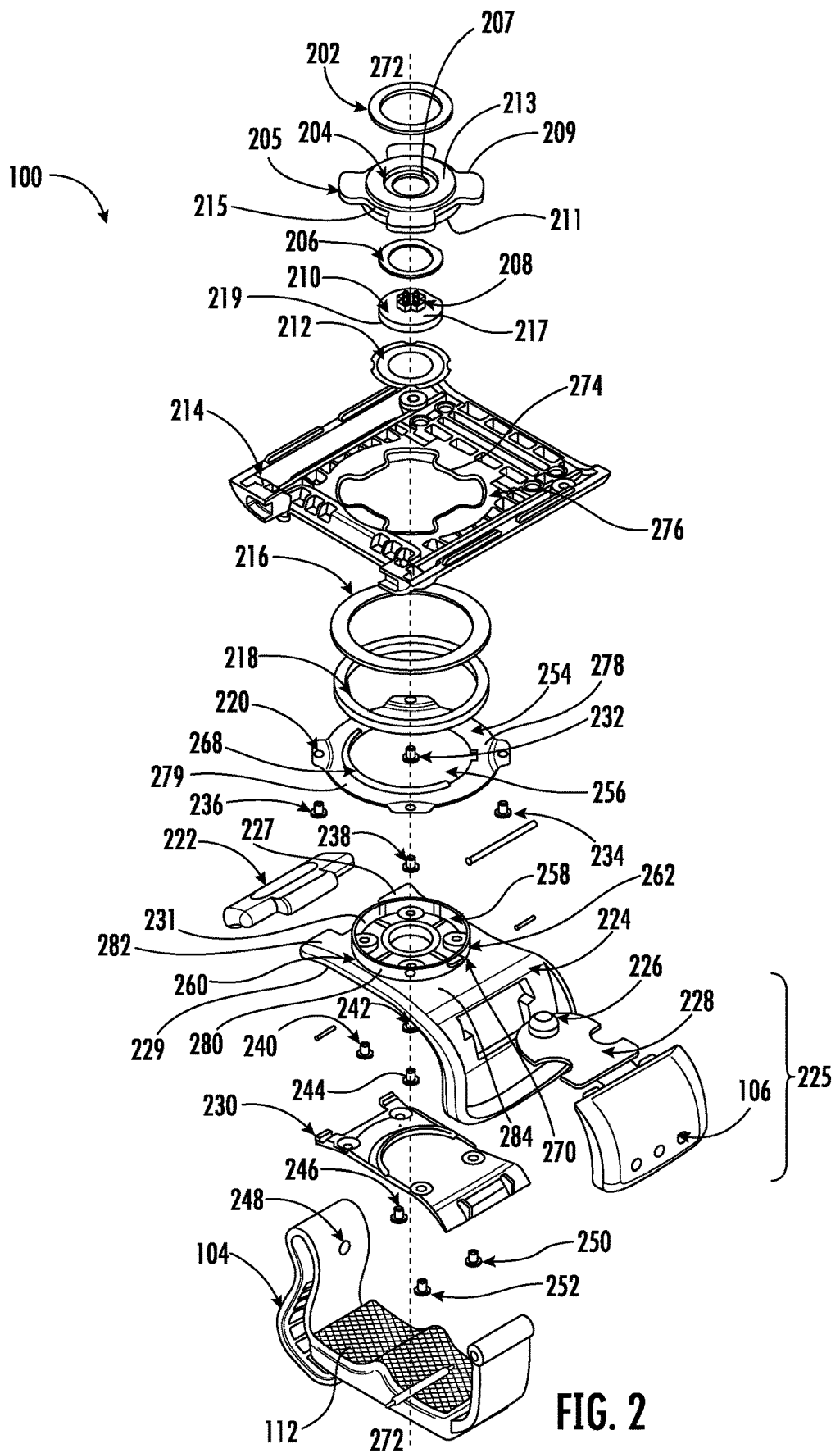
FIG. 2 exemplarily illustrates an exploded view of the attachment device, according to one or more embodiments described herein.

FIG. 2 exemplarily illustrates an exploded view of the attachment device 110, according to one or more embodiments described herein. In an embodiment, the attachment device 110 comprises the first subassembly 102 and the second subassembly 104. In an embodiment, the attachment device 110 is configured in the form of two subassemblies to facilitate rotation of the electronic device 108 such as, a ring scanner, to a desired position. For example, in order to change the orientation of the mounted electronic device 108 either the first subassembly 102 of the attachment device 110 may be rotated in one direction or the second subassembly 104 of the attachment device 110 may be rotated in the other direction to position the mounted electronic device 108 in a desired scanning or reading position.

In an embodiment, the first subassembly 102 comprises a mounting component 214. In an embodiment, the mounting component 214 may correspond to a top surface of the first subassembly 102 of the attachment device 110. In an embodiment, the mounting component 214 is defined to mount the electronic device 108 configured to be coupled to the attachment device 110. As used herein, the phrase "mounting component" refers to a support frame that is defined to accommodate an electronic device 108. For example, as exemplarily illustrated in FIG. 1, the mounting component 214 of the first subassembly 102 of the attachment device 110 is defined to accommodate the electronic device 108 such as, a ring scanner. In an example embodiment, as exemplarily illustrated in FIG. 2, the mounting component 214 may be rectangular in shape that is defined to accommodate a rectangular shaped electronic device 108. In some examples, the scope of the disclosure is not limited to the mounting component 214 having a rectangular shape, as exemplarily illustrated in FIG. 2. In an example embodiment, the shape of the mounting component 214 may correspond to other polygons depending on the shape of the electronic device 108 to be coupled to the attachment device 110, without departing from the scope of the disclosure.

In an embodiment, the mounting component 214 comprises one or more fastening elements such as, screw holes, bosses, etc., that are defined to couple with corresponding one or more fastening elements (not shown) of the electronic device 108 such as threaded inserts to ensure compact coupling of the electronic device 108 to the attachment device 110.

In an embodiment, the mounting component 214 comprises an opening 274 defining at least one slot 276. As used herein, the term "opening" refers to a cavity in the mounting component 214 to allow keying of the second subassembly 104 through the mounting component 214 of the first subassembly 102. For example, the opening 274 refers to a cavity substantially in the center of the mounting component 214 to allow keying of the second subassembly 104 through the mounting component 214. As used herein, the term "slot" refers to a structural mating feature to establish a mating connection with structural mating features defined on a corresponding mating component of the second subassembly 104 of the attachment device 110. For example, the slots 276 refer to four female mating features defined along a circular path of the opening 274 of the mounting component 214, as exemplarily illustrated in FIG. 2. In this example embodiment, the slots 276 may mate with corresponding four male mating features defined on the first rotatable component 204, which will be described in detail below with reference to structures of the first rotatable component 204 of the second subassembly 104 of the attachment device 110. In other embodiments, the scope of the disclosure is not limited to the mounting component 214 defining four slots 276 that may mate with corresponding four male mating features defined on the first rotatable component 204. In some embodiments, the mounting component 214 may define any number of slots 276 that may mate with an equal number of male mating features defined on the first rotatable component 204, without departing from the scope of the disclosure. For example, the mounting component 214 may define 6, 8, 10, etc., slots 276 that may mate with 6, 8, 10, etc., male mating features defined on the first rotatable component 204, without departing from the scope of the disclosure.

In an embodiment, the opening 274 of the mounting component 214 defines an axis 272 for rotation of the first subassembly 102. In an example embodiment, the axis 272 may correspond to an axis that may pass through the opening 274 of the mounting component 214 of the first subassembly 102 of the attachment device 110, as exemplarily illustrated in FIG. 2.

In an embodiment, the first subassembly 102 further comprises a shim component 216. In an embodiment, the shim component 216 corresponds to a metal shim configured to provide uniform force distribution of the spring component 218 of the first subassembly 102 of the attachment device 110, thereby reducing wear and tear and absorbing tolerances between mating mounting component 214 and spring component 218 of the first subassembly 102 of the attachment device 110. In an embodiment, the spring component 218 is defined to abut with the shim component 216 on a second surface 510 of the mounting component 214, corresponding to a bottom surface of the mounting component 214, for uniform force distribution of the spring component 218. For example, when the user pulls up the first subassembly 102 of the attachment device 110 to change an orientation of the electronic device 108 mounted on the mounting component 214, the spring component 218 abuts with the shim component 216.

In an embodiment, the first subassembly 102 comprises the spring component 218. As used herein, the phrase "spring component" refers to a compression spring configured to facilitate rotation of the first subassembly 102 with respect to the second subassembly 104 to allow change in orientation of the electronic device 108 configured to be coupled to the attachment device 110. In an example embodiment, the spring component 218 of the first subassembly 102 is a wave spring.

In an embodiment, the spring component 218 is coupled to the retainer component 220 of the first subassembly 102 of the attachment device 110, as exemplarily illustrated in FIGS. 3-6. As used herein, the phrase "retainer component" refers to a retaining element that is defined to retain a coupled spring component 218 such as, a wave spring in position to allow rotation of the first subassembly 102 with respect to the second subassembly 104, thereby facilitating change in orientation of the electronic device 108 configured to be coupled to the attachment device 110. In an embodiment, the spring component 218 is held in compression by the retainer component 220 affixed to the mounting component 214. In an example embodiment, the retainer component 220 is affixed to the mounting component 214 by fastening elements such as screws, engaged in screw holes formed in bosses projecting from an underside of the mounting component 214.

In an embodiment, the retainer component 220 of the first subassembly 102 defines a first annular section 278 defining the axis 272. As used herein, the phrase "first annular section" refers to a substantially central section of the retainer component 220 that defines a through hole 256. For example, the first annular section 278 of the retainer component 220 defines a through hole 256 to allow passage or removal of components of the second subassembly 104 such as the first rotatable component 204, the second rotatable component 224, a circuit assembly 210, etc.

In an embodiment, a first peripheral surface 254 of the first annular section 278 of the retainer component 220 of the first subassembly 102 comprises a bend portion 268 defined along a substantially semi-circular path on the first peripheral surface 254 of the first annular section 278 of the retainer component 220. As used herein, the phrase "peripheral surface" refers to a planar surface of the retainer component 220 that is defined along the axis 272 of rotation. For example, the first peripheral surface 254 of the retainer component 220 refers to an inner planar surface of the retainer component 220 defined along the axis 272 of rotation, as exemplarily illustrated in FIG. 2. Further, as used herein, the phrase "bend portion" refers to an elevated section of the first peripheral surface 254 of the retainer component 220 such that the bend portion 268 of the first peripheral surface 254 of the retainer component 220 appears elevated in comparison to the other peripheral surface of the retainer component 220 i.e., an outer peripheral surface 279 of the retainer component 220.

In an embodiment, the second subassembly 104 is defined to rotate about the axis 272. In an embodiment, the second subassembly 104 comprises a first rotatable component 204, a second rotatable component 224, and a trigger assembly 225. In an embodiment, the second subassembly 104 further comprises a connector unit 208, a first adhesive layer 206, a second adhesive layer 212, a cover component 230, a strap pivot component 222, and a strap component 112.

In an embodiment, the second subassembly 104 comprises a first rotatable component 204. As used herein, the phrase "first rotatable component" refers to an annular component defining one or more structural mating features defined on a rim section 215 of the first rotatable component 204 and configured to be coupled with corresponding one or more structural mating features of the mounting component 214 of the first subassembly 102 of the attachment device 110. In an embodiment, the rim section 215 corresponding to an outer rim section of the first rotatable component 204 extends from a first surface 211 of a first peripheral section 209 of the first rotatable component 204 to a second surface 213 of the first peripheral section 209 of the first rotatable component 204. In an embodiment, the second surface 213 corresponds to a top surface of the first rotatable component 204 and the first 211 surface corresponds to a bottom surface of the first rotatable component 204. In an example embodiment, the one or more structural mating features of the first rotatable component 204 correspond to tabs 205 and the one or more structural mating features of the mounting component 214 correspond to the slots 276. The tabs 205 of the first rotatable component 204 are defined to be keyed in through the slots 276 of the opening 274 of the mounting component 214 of the first subassembly 102 of the attachment device 110. In an embodiment, the first rotatable component 204 defines at least one tab 205 defined to be received within the at least one slot 276 of the opening 274 of the mounting component 214 of the first subassembly 102, which is further described in detail in conjunction with FIG. 3. In an embodiment, the tabs 205 are defined on the rim section 215 of the first rotatable component 204.

In an embodiment, the second subassembly 104 further comprises a circuit assembly 210. In an embodiment, the circuit assembly 210 may correspond to a printed circuit board (PCB) assembly configured to electrically couple the electronic device 108 mounted on the mounting component 214 of the attachment device 110 to the attachment device 110. In an embodiment, the circuit assembly 210 is housed in a second cavity of the second subassembly 104, as exemplarily illustrated in FIG. 5 and as described in further detail in conjunction with FIG. 5.

In an embodiment, the second subassembly 104 further comprises a connector unit 208 coupled to the circuit assembly 210. In an embodiment, the connector unit 208 may correspond to pin connectors such as, pogo 4-pin connectors configured to establish electrical contact with pin connectors (not shown) of the electronic device 108 when the electronic device 108 is coupled to the attachment device 110. In an embodiment, the connector unit 208 is defined to extend outwardly through the opening 274 of the mounting component 214 of the first subassembly 102 to electrically couple the attachment device 110 to an electronic device 108 configured to be coupled to the attachment device 110 via the mounting component 214 of the first subassembly 102.

In an embodiment, the second surface 213 of the first rotatable component 204 of the second subassembly 104 of the attachment device 110 defines a cavity 207 to house a connection pad 202 in the cavity 207. In an embodiment, the connection pad 202 is defined to facilitate insulation of the circuit assembly 210 from a corresponding circuit assembly of the electronic device 108 configured to be coupled to the attachment device 110.

In an embodiment, the first adhesive layer 206 is mounted on a first surface 217 of the circuit assembly 210 corresponding to a top surface of the circuit assembly 210. In an embodiment, the first adhesive layer 206 corresponds to a double-sided adhesive tape that is attached to the circuit assembly 210 to mount the circuit assembly 210 to the second surface 213 of the first rotatable component 204. In an embodiment, a second adhesive layer 212 is mounted on a second surface 219 of the circuit assembly 210 corresponding to a bottom surface of the circuit assembly 210. In an embodiment, the second adhesive layer 212 is a layered material that consists of a polyamide film such as, a Kapton film, a thin rubbery overlay material, and adhesive backing. The second adhesive layer 212 is configured to provide an ingress protection (IP) seal for the circuit assembly 210 and protect the circuit assembly 210 against electrostatic discharge.

In an embodiment, the second subassembly 104 comprises a second rotatable component 224. As used herein, the phrase "second rotatable component" refers to an annular structured component defining a second annular section 258 with an elevated leg section 280 and two flange sections 282 and 284 extending from the elevated leg section 280, as exemplarily illustrated in FIG. 2. In an embodiment, the elevated leg section 280 may define a second peripheral section 231 such that a first surface 229 of the second peripheral section 231 of the second rotatable component 224 is defined to mate with the second surface 213 of the first peripheral section 209 of the first rotatable component 204 via suitable fasteners, such screws, engaged in screw holes formed in bosses projecting from the second surface 213 of the first rotatable component 204. In an embodiment, the first surface 229 of the second peripheral section 231 may correspond to a bottom surface of the second peripheral section 231 of the second rotatable component 224. The elevated leg section 280 may define a through hole extending from the first surface 229 of the second peripheral section 231 of the second rotatable component 224 to a second surface 227 of the second peripheral section 231 of the second rotatable component 224 about the axis 272. In an embodiment, the second surface 227 of the second peripheral section 231 may correspond to a top surface of the second peripheral section 231 of the second rotatable component 224. In an embodiment, the through hole of the elevated leg section 280 of the second rotatable component 224 defines a second cavity in the second rotatable component 224, which is described in further detail in conjunction with FIGS. 5 and 6.

In an embodiment, a first flange section 282 of the second rotatable component 224 is defined to mate with a strap pivot component 222, which is described in further detail in the detailed description below. In an embodiment, a second flange section 284 of the second rotatable component 224 extends into a curved side wall from the second peripheral section 231 of the second rotatable component 224. In an embodiment, the curved side wall is defined to house a trigger assembly 225, which is described in further detail in the detailed description below.

Figure 4:
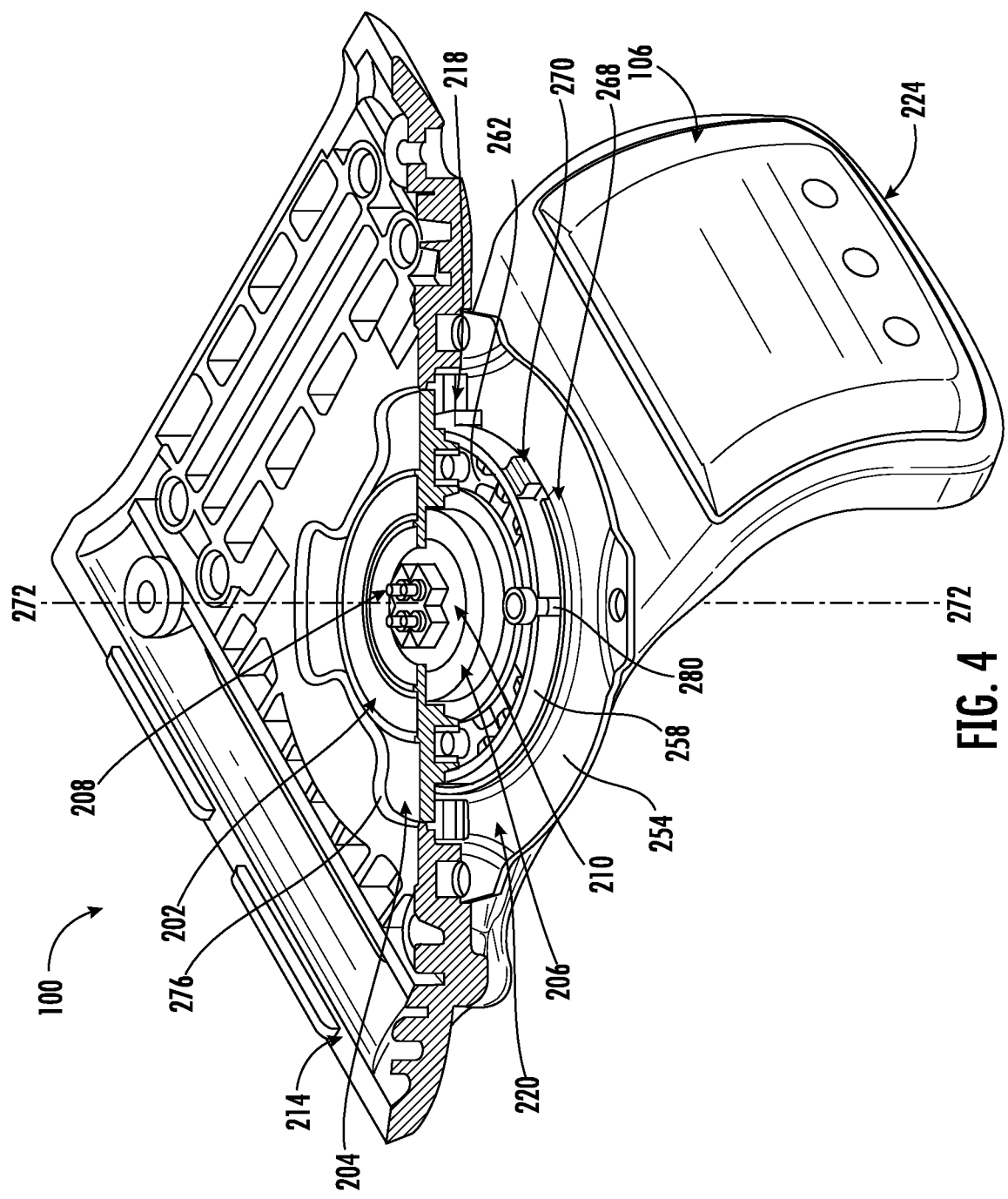
FIG. 4 exemplarily illustrates another partial sectional view of the attachment device, according to one or more embodiments described herein.

In an embodiment, an outer surface 262 of the elevated leg section 280 of the second annular section 258 of the second rotatable component 224 defines a protrusion 270 configured to restrict rotation of the first subassembly 102 about the axis 272 in one direction when the bend portion 268 on the first peripheral surface 254 of the retainer component 220 of the first subassembly 102 contacts the protrusion 270 on the outer surface 262 of the elevated leg section 280 of the second annular section 258 of the second rotatable component 224 of the second subassembly 104, which is described in further detail in conjunction with FIG. 4.

In an embodiment, the second subassembly 104 further comprises the strap pivot component 222. As used herein, the phrase "strap pivot component" refers to a pivot component defined to attach a strap component 112 of the attachment device 110 to the second rotatable component 224 of the attachment device 110. In an embodiment, the strap component 112 may be coupled to a first end of the strap pivot component 222 and the first flange section 282 of the second rotatable component 224 is coupled to a second end of the strap pivot component 222. In an embodiment, the strap pivot component 222 allows the strap component 112 to be pivoted about the first flange section 284 of the second rotatable component 224 to allow a user to ergonomically adjust fitting of the strap component 112 on the user's finger. In an embodiment, the strap component 112 of the attachment device 110 is made of a suitable material to provide a comfortable secure fit, yet flexible enough to be used for a wide range of ring sizes. In an embodiment, the strap component 112 of the attachment device 110 has a design that allows a user to easily insert the attachment device 110 onto his or her finger and allows the attachment device 110 to be easily removed.

In an embodiment, the second subassembly 104 further comprises the trigger assembly 225. As used herein, the phrase "trigger assembly" refers to an assembly comprising components of a trigger mechanism configured to actuate the electronic device 108 configured to be coupled to the mounting component 214 of the first subassembly 102 of the attachment device 110. In an embodiment, the trigger assembly 225 is housed in the second cavity of the second rotatable component 224, which described in further detail in conjunction with FIG. 5.

In an embodiment, the trigger assembly 225 comprises a trigger button 106 and a trigger actuator 226. As used herein, the phrase "trigger button" refers to an electric switch mechanism that is configured to actuate the electronic device 108 configured to be coupled to the mounting component 214 of the first subassembly 102 of the attachment device 110, when the trigger button 106 may be switched on or off by a user. In an example embodiment, the trigger button 106 may correspond to a push button that the user may push with a thumb of his/her hand when the attachment device 110 coupled to the electronic device 108 is inserted onto the user's index finger. Pushing of the trigger button 106 may actuate the electronic device 108 coupled to the attachment device 110. In an embodiment, the trigger button 106 is mounted on the curved side wall extending from the second flange section 284 of the second rotatable component 224 of the second subassembly 104, as exemplarily illustrated in FIG. 2.

In an embodiment, the trigger actuator 226 is electrically coupled to the trigger button 106 using a molded sheet 228, as exemplarily illustrated in FIG. 2. In an embodiment, the molded sheet 228 refers to a molded metal sheet configured to ensure electrical connection between the trigger actuator 226 and the trigger button 106. In an embodiment, the trigger actuator 226 comprises an actuation switch that is depressed when the trigger button 106 is depressed or pushed by a user. In an embodiment, the actuation switch of the trigger actuator 226 is electrically coupled to a switch of the circuit assembly 210 to allow actuation of the electronic device 108 coupled to the attachment device 110, which is described in further detail in conjunction with FIG. 5. In an embodiment, the trigger actuator 226 is housed in the second cavity of the second subassembly 104, as exemplarily illustrated in FIG. 5 and as described in further detail in conjunction with FIG. 5.

In an embodiment, the second subassembly 104 further comprises a cover component 230. In an embodiment, the cover component 230 is defined to cover the first surface 229 of the second rotatable component 224 of the second subassembly 104 of the attachment device 110, thereby providing cover and protection to all components of the attachment device 110. In an embodiment, the cover component 230 may be mounted onto the first surface 229 of the second rotatable component 224 via fasteners such as screws exemplarily illustrated in FIG. 2.

Figure 3:
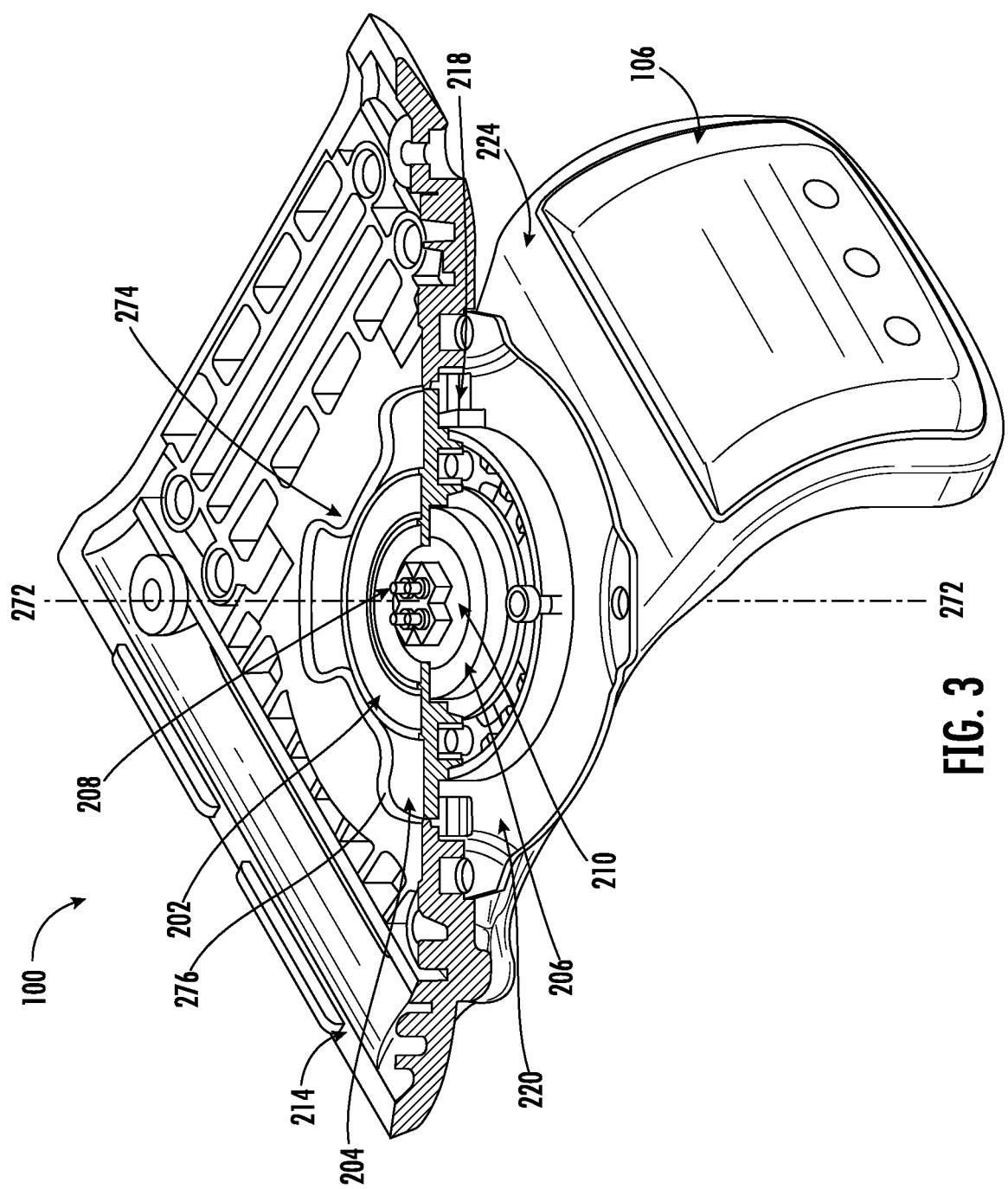
FIG. 3 exemplarily illustrates a partial sectional view of the attachment device, according to one or more embodiments described herein.

FIG. 3 exemplarily illustrates a partial sectional view of the attachment device 110, according to one or more embodiments described herein. As exemplarily illustrated in FIG. 3, the second subassembly 104 of the attachment device 110 is pivotally coupled to the first subassembly 102 of the attachment device 110. For example, the first rotatable component 204 of the second subassembly 104 is mated with the second rotatable component 224 of the second subassembly 104. Further, the mounting component 214 of the first subassembly 102 is mounted on the second rotatable component 224 of the second subassembly 104. The tabs 205 of the first rotatable component 204 of the second subassembly 104 are keyed into the slots 276 of the opening 274 of the mounting component 214 of the first subassembly 102. The connector unit 208 of the second subassembly 104 allows electrical coupling of the attachment device 110 to the electronic device 108 configured to be coupled to the attachment device 110. If a user wishes to change an orientation of the electronic device 108, the pivotal coupling of the first subassembly 102 to the second subassembly 104 allows the rotation of the electronic device 108 about the axis 272 to a desired position. In an embodiment, the pivotal coupling of the first subassembly 102 to the second subassembly 104 allows a 360° rotation of the electronic device 108 about the axis 272 to any desired position. The spring component 218 retained by the retainer component 220 of the first subassembly 102 facilitates the rotation of the electronic device 108 about the axis 272 to the desired position. For example, when the user wishes to position the electronic device 108 coupled to the attachment device 110 from the user's left hand to the user's right hand, the user may lift the mounting component 214 of the first subassembly 102 to rotate the first subassembly 102 in counterclockwise direction to reorient a scanning head portion of the electronic device 108 to a forward facing position, while the strap component 112 of the second subassembly 104 of the attachment device 110 is affixed on the user's right hand index finger. Accordingly, to actuate the electronic device 108 for scanning purposes, the user may depress the trigger button 106 mounted on the second rotatable component 224 of the second subassembly 104 of the attachment device 110 using the user's right-hand thumb.

FIG. 4 exemplarily illustrates another partial sectional view of the attachment device 110, according to one or more embodiments described herein. FIG. 4 exemplarily illustrates the bend portion 268 on the first peripheral surface 254 of the retainer component 220 of the first subassembly 102 and the protrusion 270 on the outer surface 262 of the elevated leg section 280 of the second annular section 258 of the second rotatable component 224 of the second subassembly 104. In an embodiment, the bend portion 268 and the protrusion 270 are defined to restrict rotation of the electronic device 108 configured to be coupled to the attachment device 110 about 180 degrees in one direction i.e. counterclockwise direction. Such a restriction in the rotational movement of the first subassembly 102 or the second subassembly 104 of the attachment device 110 is envisaged to ensure that a scanning head of the electronic device 108 such as, a ring scanner, does not point directly at the user's eye, thereby protecting the user's eye from light flashes from the scanning head when the electronic device 108 is actuated by depressing the trigger button 106. As is exemplarily illustrated in FIG. 4, if the user tries to rotate the first subassembly 102 or the second subassembly 104 of the attachment device 110 in clockwise direction, the bend portion 268 on the first peripheral surface 254 of the retainer component 220 of the first subassembly 102 prohibits the rotation of the second rotatable component 224 of the second subassembly 104 when the protrusion 270 on the outer surface 262 of the elevated leg section 280 of the second annular section 258 of the second rotatable component 224 of the second subassembly 104 contacts the bend portion 268. In other embodiments, the scope of the disclosure is not limited to the first peripheral surface 254 of the retainer component 220 of the first subassembly 102 defining the bend portion 268 and the outer surface 262 of the elevated leg section 280 of the second annular section 258 of the second rotatable component 224 of the second subassembly 104 defining the protrusion 270. In another embodiment, the retainer component 220 of the first subassembly 102 is not limited to defining the bend portion 268 and the second rotatable component 224 of the second subassembly 104 is not limited to defining the protrusion 270, such that the first subassembly 102 may be rotated with respect to the second subassembly 104 to allow a 360° rotation of the electronic device 108 with respect to the attachment device 110 about the axis 272 to any desired position, as described in detail in conjunction with FIG. 3.

Figure 5:
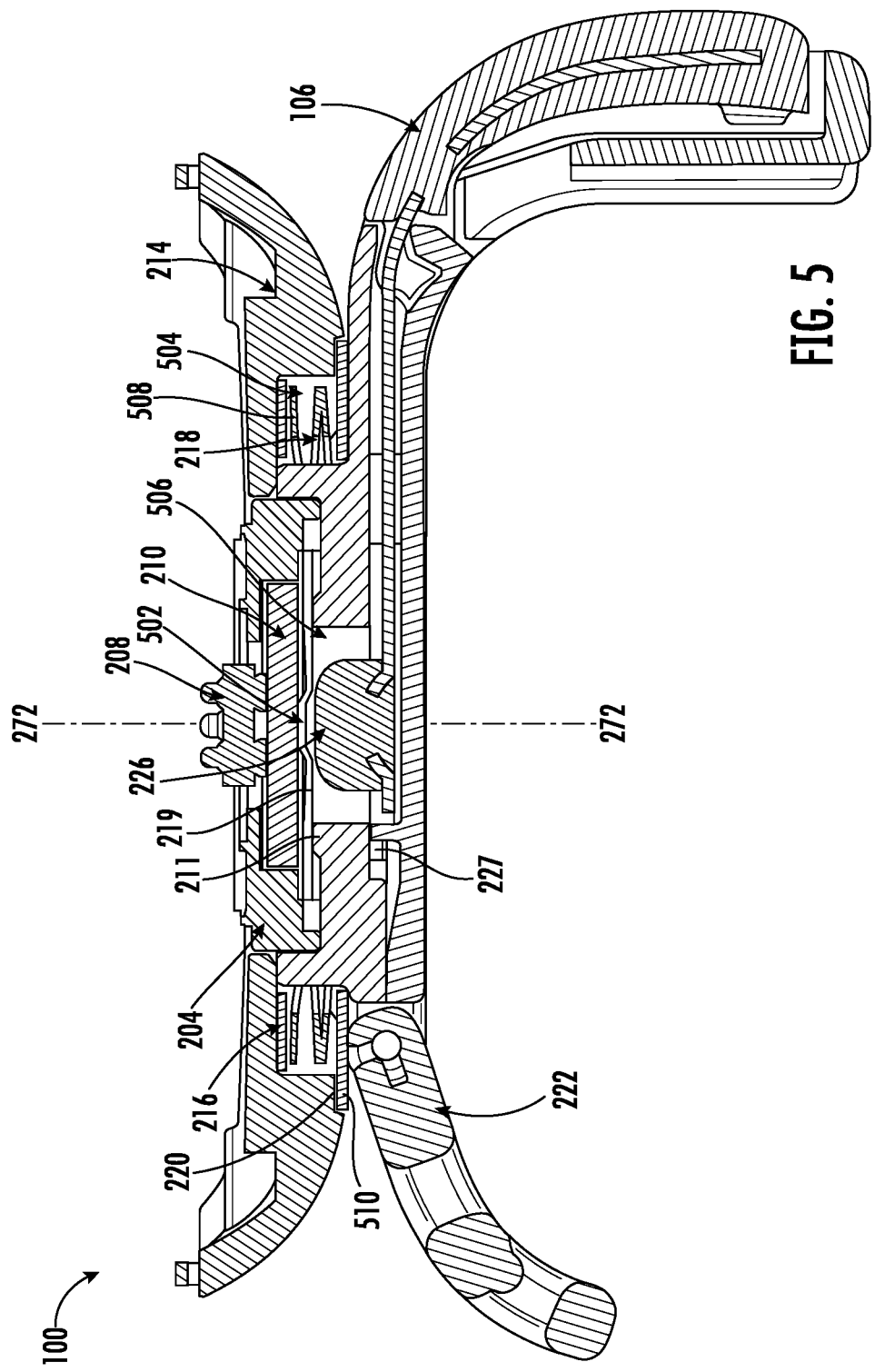

FIGS. 5-6 exemplarily illustrate sectional views of the attachment device 110 showing two modes of operation of the attachment device 110, according to one or more embodiments described herein. In an embodiment, FIG. 5 exemplarily illustrates a sectional view of the attachment device 110 when the attachment device 110 is at rest and the trigger button 106 may be depressed to actuate the electronic device 108 configured to be coupled to the attachment device 110. In an embodiment, FIG. 6 exemplarily illustrates another sectional view of the attachment device 110 when a user may change an orientation of the electronic device 108 configured to be coupled to the attachment device 110 by either rotating the first subassembly 102 or the second subassembly 104 of the attachment device 110 about the axis 272.

In an embodiment, FIG. 5 exemplarily illustrates the retainer component 220 being coupled to the mounting component 214. The coupling of the retainer component 220 to the mounting component 214 defines a first cavity 504 extending from the first surface 508 of the mounting component 214 to the second surface 510 of the mounting component 214. As exemplarily illustrated in FIG. 5, the first surface 508 of the mounting component 214 is opposite the second surface 510 of the mounting component 214. In an embodiment, the spring component 218 of the first subassembly 102 of the attachment device 110 is housed in the first cavity 504, as exemplarily illustrated in FIG. 5.

In an embodiment, FIG. 5 exemplarily illustrates the second rotatable component 224 being coupled to the first rotatable component 204 defining a second cavity 506. In an embodiment, the second cavity 506 extends from a first surface 211 of the first rotatable component 204 to a second surface 227 of the second rotatable component 224. In an embodiment, the first surface 211 of the first rotatable component 204 is opposite the second surface 227 of the second rotatable component 224. In an embodiment, the trigger actuator 226 of the trigger assembly 225 is housed in the second cavity 506 of the second subassembly 104, as exemplarily illustrated in FIG. 5.

In an embodiment, the second surface 219 of the circuit assembly 210 is defined to mount a switch 502 thereon. In an embodiment, the switch 502 of the circuit assembly 210 may correspond to a dome switch. In an embodiment, the second surface 219 of the circuit assembly 210 is opposite the trigger actuator 226 housed in the second cavity 506 of the second subassembly 104 such that, the switch of the trigger actuator 226 is in contact with the switch 502 of the circuit assembly 210 to provide electrical coupling between the circuit assembly 210 and the trigger assembly 225. In an embodiment, the switch 502 of the circuit assembly 210 is defined to contact the switch of the trigger actuator 226 for trigger activation when a user depresses the trigger button 106 of the trigger assembly 225.

In an embodiment, FIG. 6 exemplarily illustrates compression of the spring component 218 of the first subassembly 102 of the attachment device 110 when either the first subassembly 102 or the second subassembly 104 of the attachment device 110 is pulled and rotated to change an orientation of the electronic device 108 configured to be coupled to the attachment device 110. In an embodiment, the at least one tab 205 of the first rotatable component 204 of the second subassembly 104 is defined to retract inwardly through the at least one slot 276 of the opening 274 of the mounting component 214 of the first subassembly 102, in response to the mounting component 214 of the first subassembly 102 being pulled up, to allow rotation of an electronic device 108 configured to be coupled to the attachment device 110 via the mounting component 214 of the first subassembly 102. In another embodiment, the at least one tab 205 of the first rotatable component 204 of the second subassembly 104 is defined to retract inwardly through the at least one slot 276 of the opening 274 of the mounting component 214 of the first subassembly 102, in response to the second rotatable component 224 of the second subassembly 104 being pulled down, to allow rotation of an electronic device 108 configured to be coupled to the attachment device 110 via the mounting component 214 of the first subassembly 102. In either embodiment, the spring component 218 compresses and provided sufficient frictional force to facilitate the rotational movement of the first subassembly 102 or the second subassembly 104 of the attachment device 110. Once the user has placed the electronic device 108 in a desired position, the user may release the first subassembly 102 or the second subassembly 104, thereby releasing the frictional force provided by the compressed spring component 218 and the attachment device 110 reconfigures to the mode of operation exemplarily illustrated in FIG. 5. Hence, the user may rotate the electronic device 108 to any desired ergonomic position or easily switch between right-handed or left-handed operation of the electronic device 108 with the use of the attachment device 110 disclosed herein.

In the specification and figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of schematics, exemplary, and examples. Insofar as such schematics and examples contain one or more functions and/or operations, each function and/or operation within such schematics or examples can be implemented, individually and/or collectively, by a wide range of hardware thereof.

The various embodiments described above can be combined with one another to provide further embodiments. For example, two or more of example embodiments described above may be combined to, for example, improve the safety of laser printing and reduce the risks associated with laser-related accidents and injuries. These and other changes may be made to the present systems and methods in light of the above detailed description. Accordingly, the disclosure is not limited by the disclosure, but instead its scope is to be determined by the following claims.

The invention claimed is:

1. An attachment device comprising:
a first subassembly comprising:
a mounting component comprising an opening defining at least one slot, wherein the opening of the mounting component defines an axis for rotation of the first subassembly;
a retainer component coupled to the mounting component defining a first cavity extending from a first surface of the mounting component to a second surface of the mounting component; and
a spring component coupled to the retainer component, the spring component being housed in the first cavity; and
a second subassembly coupled to the first subassembly, wherein the second subassembly is defined to rotate about the axis, the second subassembly comprising:
a first rotatable component defining at least one tab defined to be received within the at least one slot of the opening of the mounting component of the first subassembly;
a second rotatable component coupled to the first rotatable component; and
a trigger assembly coupled to the second rotatable component, wherein the trigger assembly comprises a trigger actuator.

2. The attachment device of claim 1, wherein the mounting component of the first subassembly is defined to mount an electronic device configured to be coupled to the attachment device.

3. The attachment device of claim 1, wherein the trigger assembly of the second subassembly is configured to actuate an electronic device configured to be coupled to the attachment device via the mounting component of the first subassembly.

4. The attachment device of claim 1, wherein the coupling of the second rotatable component to the first rotatable component defines a second cavity extending from a first surface of the first rotatable component to a second surface of the second rotatable component, wherein the first surface of the first rotatable component is opposite the second surface of the second rotatable component.

5. The attachment device of claim 4, wherein the trigger assembly comprises the trigger actuator being housed in the second cavity.

6. The attachment device of claim 1, wherein the second subassembly comprises a strap component to actuate the electronic device mounted on the first subassembly of the attachment device by depressing a trigger button.

7. The attachment device of claim 1, wherein the first subassembly further comprises a shim component to provide uniform force distribution of the spring component of the first subassembly.

8. The attachment device of claim 1, wherein the second subassembly further comprises a connector unit, a first adhesive layer, a second adhesive layer, and a strap component.

9. The attachment device of claim 1, wherein the at least one tab of the first rotatable component of the second subassembly is defined to retract inwardly through the at least one slot of the opening of the mounting component of the first subassembly, in response to the mounting component of the first subassembly being pulled up or the second rotatable component of the second subassembly being pulled down, to allow rotation of an electronic device configured to be coupled to the attachment device via the mounting component of the first subassembly.

10. The attachment device of claim 1, wherein the trigger assembly of the second subassembly comprises:
a trigger button mounted on a second surface of the second rotatable component of the second subassembly; and
the trigger actuator electrically coupled to the trigger button.

11. An apparatus comprising:
an attachment device comprising:
a first subassembly comprising:
a mounting component comprising an opening defining at least one slot, wherein the opening of the mounting component defines an axis for rotation of the first subassembly;

a retainer component coupled to the mounting component defining a first cavity extending from a first surface of the mounting component to a second surface of the mounting component; and a spring component coupled to the retainer component, the spring component being housed in the first cavity; and a second subassembly coupled to the first subassembly, wherein the second subassembly is defined to rotate about the axis, the second subassembly comprising:

a first rotatable component defining at least one tab defined to be received within the at least one slot of the opening of the mounting component of the first subassembly;

a second rotatable component coupled to the first rotatable component; and a trigger assembly coupled to the second rotatable component, wherein the trigger assembly comprises a trigger actuator; and an electronic device configured to be coupled to the attachment device.

12. The apparatus of claim 11, wherein the mounting component of the first subassembly of the attachment device is defined to mount the electronic device.

13. The apparatus of claim 11, wherein the coupling of the second rotatable component to the first rotatable component defines a second cavity extending from a first surface of the first rotatable component to a second surface of the second rotatable component, wherein the first surface of the first rotatable component is opposite the second surface of the second rotatable component.

14. The apparatus of claim 13, wherein the trigger assembly comprises a trigger actuator being housed in the second cavity.

15. The apparatus of claim 11, wherein the second subassembly comprises a strap component to actuate the electronic device mounted on the first subassembly of the attachment device by depressing a trigger button.

16. The apparatus of claim 11, wherein the first subassembly further comprises a shim component to provide uniform force distribution of the spring component of the first subassembly.

17. The apparatus of claim 11, wherein the second subassembly further comprises a connector unit, a first adhesive layer, a second adhesive layer, and a strap component.

18. The apparatus of claim 11, wherein the at least one tab of the first rotatable component of the second subassembly of the attachment device is defined to retract inwardly through the at least one slot of the opening of the mounting component of the first subassembly of the attachment device, in response to the mounting component of the first subassembly being pulled up or the second rotatable component of the second subassembly being pulled down, to allow rotation of the electronic device.

19. The apparatus of claim 11, wherein the trigger assembly of the second subassembly of the attachment device comprises:

a trigger button mounted on a second surface of the second rotatable component of the second subassembly; and the trigger actuator electrically coupled to the trigger button.

20. The apparatus of claim 19, further comprising:

a circuit assembly housed in a second cavity of the second subassembly of the attachment device, wherein a surface of the circuit assembly is defined to mount a switch thereon, wherein the surface of the circuit assembly is opposite the trigger actuator housed in the second cavity of the second subassembly of the attachment device, and wherein the switch is defined to contact the trigger actuator for trigger activation when a user depresses the trigger button.

* * * * *